(12) United States Patent
Gloudemans, II et al.

(10) Patent No.: US 7,221,794 B1
(45) Date of Patent: May 22, 2007

(54) FOREGROUND DETECTION

(75) Inventors: James R. Gloudemans, II, San Mateo, CA (US); Walter Hsiao, Mountain View, CA (US)

(73) Assignee: Sportsvision, Inc., New York, NY (US)

( * ) Notice: Subject to any disclaimer, the term of this patent is extended or adjusted under 35 U.S.C. 154(b) by 1000 days.

(21) Appl. No.: 09/929,598

(22) Filed: Aug. 13, 2001

Related U.S. Application Data

(60) Provisional application No. 60/256,420, filed on Dec. 18, 2000.

(51) Int. Cl.
 *G06K 9/34* (2006.01)
(52) U.S. Cl. ............ 382/176; 382/190; 382/154; 382/173
(58) Field of Classification Search ........... 382/110, 382/190, 236, 283, 141, 164, 294, 176, 154, 382/173; 345/419, 422, 592, 427; 359/478; 352/45, 133; 348/159
See application file for complete search history.

(56) References Cited

U.S. PATENT DOCUMENTS

| | | | | |
|---|---|---|---|---|
| 5,546,475 A | * | 8/1996 | Bolle et al. ............... | 382/190 |
| 5,559,632 A | * | 9/1996 | Lawrence et al. .......... | 359/478 |
| 5,659,323 A | * | 8/1997 | Taylor ...................... | 348/159 |
| 5,850,352 A | | 12/1998 | Moezzi et al. ............. | 345/419 |
| 5,923,400 A | * | 7/1999 | Spector ..................... | 352/45 |
| 6,078,701 A | * | 6/2000 | Hsu et al. .................. | 382/294 |
| 6,154,251 A | * | 11/2000 | Taylor ...................... | 348/159 |
| 6,310,964 B1 | * | 10/2001 | Mohan et al. ............. | 382/110 |
| 6,331,871 B1 | * | 12/2001 | Taylor ...................... | 348/159 |
| 6,933,966 B2 | * | 8/2005 | Taylor ...................... | 348/159 |

* cited by examiner

*Primary Examiner*—Anh Hong Do
(74) *Attorney, Agent, or Firm*—Vierra Magen Marcus & DeNiro LLP

(57) ABSTRACT

A system is disclosed that can find an image of a foreground object in a still image or video image. Finding the image of the foreground object can be used to reduce errors and reduce the time needed when creating morphs of an image. One implementation uses the detection of the image of the foreground object to create virtual camera movement, which is the illusion that a camera is moving around a scene that is frozen in time.

57 Claims, 9 Drawing Sheets

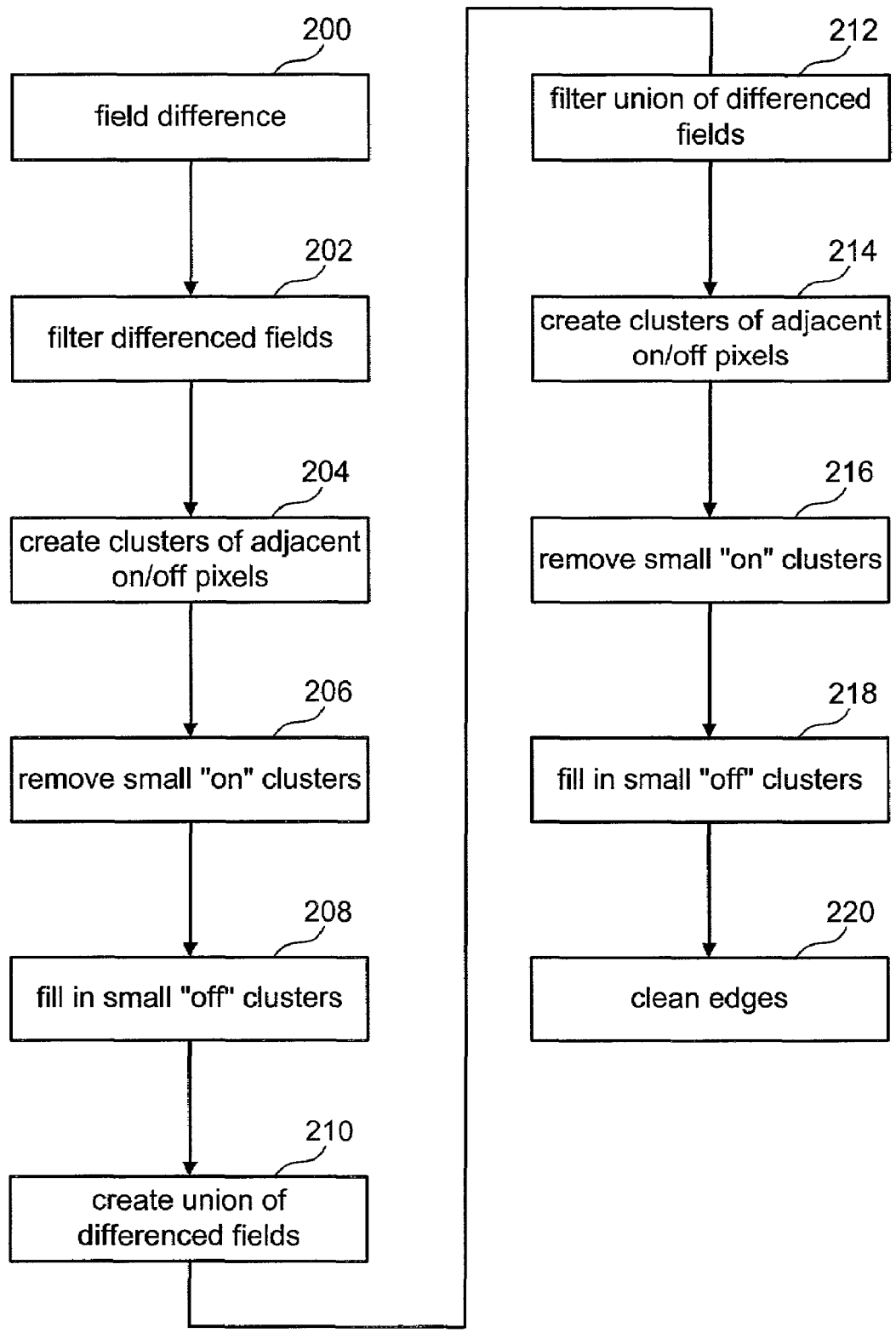

Fig. 6A
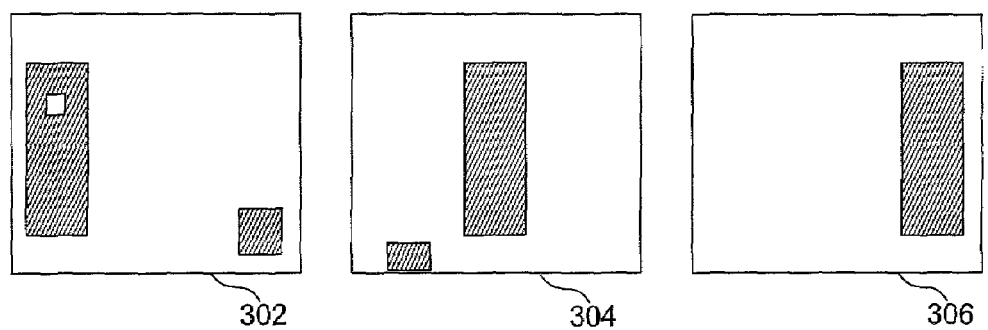
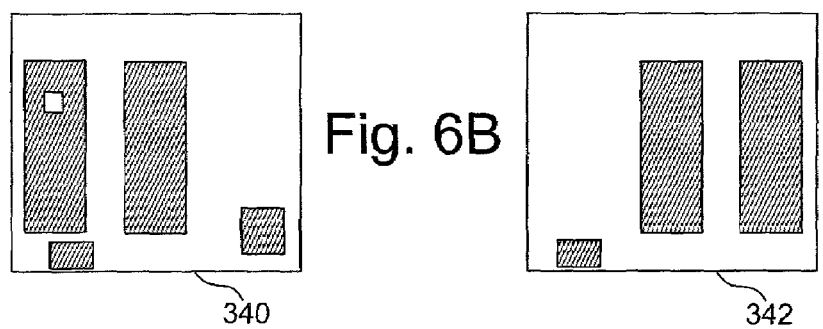
Fig. 6B
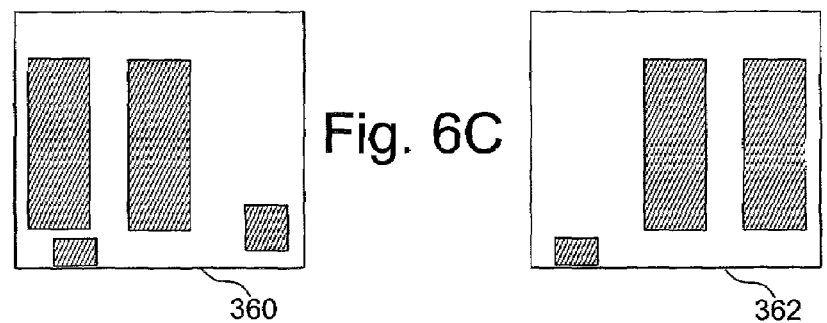
Fig. 6C
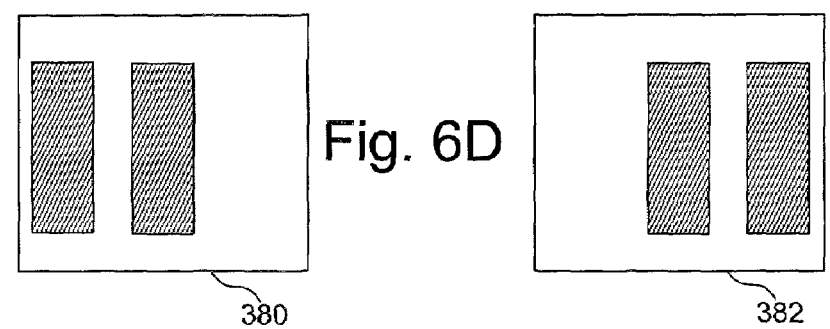
Fig. 6D
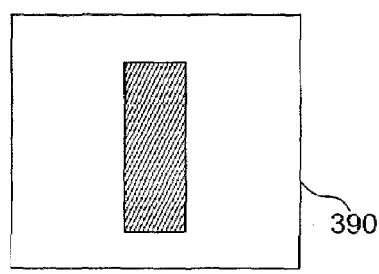
Fig. 6E

FOREGROUND DETECTION

This application claims the benefit of U.S. Provisional Application No. 60/256,420, Foreground/Background Detection, filed Dec. 18, 2000, incorporated herein by reference.

BACKGROUND OF THE INVENTION

1. Field of the Invention

The present invention is directed to technology for finding the foreground of an image.

2. Description of the Related Art

Virtual camera movement has become an increasingly popular effect for instant reply during sporting events, commercials, movies and other video applications. Virtual camera movement conveys the illusion that a camera is moving around a scene frozen in time. In most cases, the scene is depicted in a three dimensional manner. For example, virtual camera motion has been used in the movie "The Matrix," and in commercials for the Gap, AT&T and Discover.

One example of virtual camera movement can be found in U.S. Pat. No. 5,659,323, "System for Producing Time-Independent Virtual Camera Movement in Motion Pictures and Other Media," by Taylor ("the '323 patent"). The '323 patent discloses a system with an array of cameras that are deployed along a pre-selected path with each camera focused on a common scene. Each camera is triggered simultaneously to record a still image of the common scene, and the images are transferred from the cameras in a pre-selected order along the path onto a sequence of frames in motion picture film or video tape. Because each frame shows the common scene from a different viewpoint, placing the frames in sequence gives the illusion that one camera has moved around a frozen scene.

One shortcoming of the system disclosed in the '323 patent is that it requires a large number of cameras. Each different view (or angle) uses a separate camera. Such a system is very expensive to deploy. For example, a provider of such a system will need to purchase (or lease) many cameras and a large amount of supporting equipment. The cost of purchasing or leasing such a system will be very expensive. The cost of maintaining, transporting and setting up the equipment will be too expensive for such a system to be used on a regular basis. Additionally, many events take place simultaneously or close in time at different locations; therefore, many systems would be needed, which further drives up the costs.

A system that uses a large amount of camera may also be impractical from a logistics point of view. For example, a system that uses thirty cameras may not be able to be deployed at all stadiums or theaters because of a lack of space to place the cameras.

Thus, a system is needed to provide virtual camera movement that requires less cameras than that of the prior art systems.

SUMMARY OF THE INVENTION

The present invention, roughly described, pertains to technology for finding the foreground in still images or video images. Finding the foreground can be used to reduce errors and reduce the time needed when creating morphs of an image. Creating morphs using the foreground detection technology of the present invention can be used to create virtual camera movement with significantly less cameras than the prior art described above.

One embodiment of the present invention includes a machine implemented method for producing virtual camera motion. The method includes receiving a set of two or more images of a scene and identifying the foreground for at least a subset of the images of the scene. A video of the scene is created which includes an illusion of a camera moving around the scene. The video is created based on the set of two or more images and the step of identifying the foreground. The machine implementing the method can include a computer, or any other apparatus or device that can process data.

Another embodiment includes the steps of receiving two or more images of a scene which view a foreground object from a first set of different angles and identifying foreground for the two or more images of the scene. One or more new images of the scene are created based on the received two or more images and the step of identifying foreground. The new images appear to view the foreground object from new angles different than the first set of different angles.

In one embodiment, the video with the virtual camera movement is used as part of an instant reply during a live sporting event. In other embodiments, the video with the virtual camera movement can be used in movies, television programs, or other video applications.

The technology for finding the foreground of an image can be used for applications other than creating virtual camera movement. One embodiment of a process for finding the foreground of an image includes receiving a first image, a second image and a third image from a first camera. The first image is subtracted from the second image to create a first difference. The third image is subtracted from the first image to create a second difference. The system then creates a union of the first difference and the second difference such that the union identifies the foreground. Various implementations include different means for filtering, clustering and cleaning edges.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. The software can be used to program one or more processors to implement the processes described herein. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 5 is a flow chart describing one embodiment of the process for finding moving foreground objects. FIG. 5 is performed on each channel for each camera.

FIGS. 6A–E depict video data. FIG. 6 is used to explain the process of FIG. 5.

DETAILED DESCRIPTION

Figure 1:
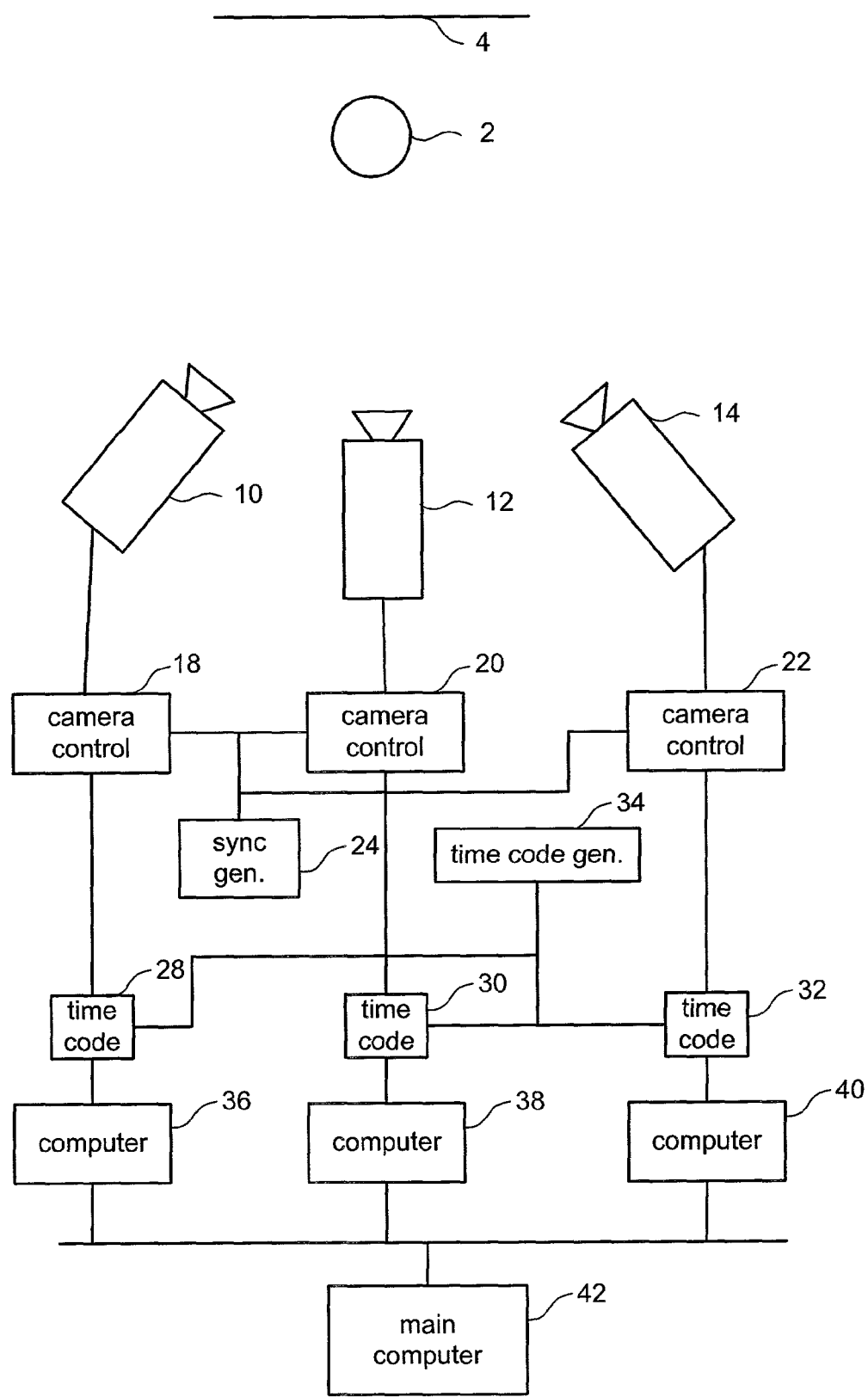
FIG. 1 is a block diagram depicting the components of one embodiment of the present invention.

FIG. 1 is a block diagram depicting the components of one embodiment of the present invention. At the top of FIG. 1 is a scene being captured by a set of cameras. The scene includes a set of one or more foreground objects 2 and a set of one or more background objects 4. The scene is being captured by video cameras 10, 12 and 14. Although FIG. 1 depicts video cameras, the present invention also works with still cameras and other suitable sensors (e.g., infrared sensors, etc.). Connected to the cameras are camera control electronics 18, 20 and 22. Camera control electronics 18 is connected to camera 10. Camera control electronics 20 is connected to camera 12. Camera control electronics 22 is connected to camera 14. In one embodiment, cameras 10, 12 and 14 are Sony DXC-390 cameras and are spaced 10 degrees apart. In other embodiments, the cameras can be spaced further apart or less further apart. Note that while FIG. 1 shows three cameras, the present invention works with more or less than three cameras. One embodiment uses 10 cameras. Camera control electronics 18, 20 and 22 include a power supply and control signals for each of the cameras. Camera control electronics also receive the video from the cameras. Each of the camera control electronics 18, 20 and 22 receive a signal from sync generator 24. Sync generator 24 is used to synchronize the cameras. Based on the signal from sync generator 24, camera control electronics 18, 20 and 22 send signals to each of the cameras to capture video in synchronization.

Each of the camera control electronics 18, 20 and 22 output video in the form of S-Video. The video from camera control electronics 18 is communicated to time code inserter 28. The video from camera control electronics 20 is communicated to time code inserter 30. The video from camera control electronics 22 is communicated to time code inserter 32. Time code generator 34 creates time codes which are sent to time code inserters 28, 30 and 32. These time codes are added to the video received from the camera control electronics 18, 20 and 22. In one embodiment, the time code is added to the vertical blanking interval of the video. In other embodiments, the time code can be added to other portions of the video data. The purpose of the time code is to allow the system to identify fields or frames (or other units) of video that were captured by the cameras at the same time. Thus, if a particular field is identified for one camera, the corresponding field can be identified for the other cameras. The video from time code inserter 28, with time codes inserted, is communicated to computer 36. The video from time code inserter 30, with time codes inserted, is communicated to computer 38. The video from time code inserter 32, with time codes inserted, is communicated to computer 40.

In one embodiment, each of the computers 36, 38 and 40 are standard personal computers with video grabber boards. An example of a video grabber board suitable for the present invention is a Pinnacle DC-30. Other types of computers and special purpose video computers (e.g. from Silicon Graphics, Inc.) can also be used. Computers 36, 38 and 40 are in communication with main computer 42 via a network. In one embodiment, the network is an Ethernet. Main computer 42 can be a standard personal computer, workstation, minicomputer, main frame or a high-end graphics computer such as those purchased from Silicon Graphics, Inc. Computers 36, 38 and 40 are used to collect the video from the cameras and store the data in a circular buffer (or other data structure) until an operator decides to create a video with virtual camera movement. In one embodiment, the video is in MJPEG format. Main computer 42 receives the appropriate fields of video and creates a video of the scene conveying an illusion that a camera is moving around the scene, the scene appearing to be frozen in time. In one embodiment, main computer 42 performs the foreground detection and prepares the video with virtual camera movement. In other embodiments, some of the steps can be distributed to computer 36, 38 or 40.

Figure 2:
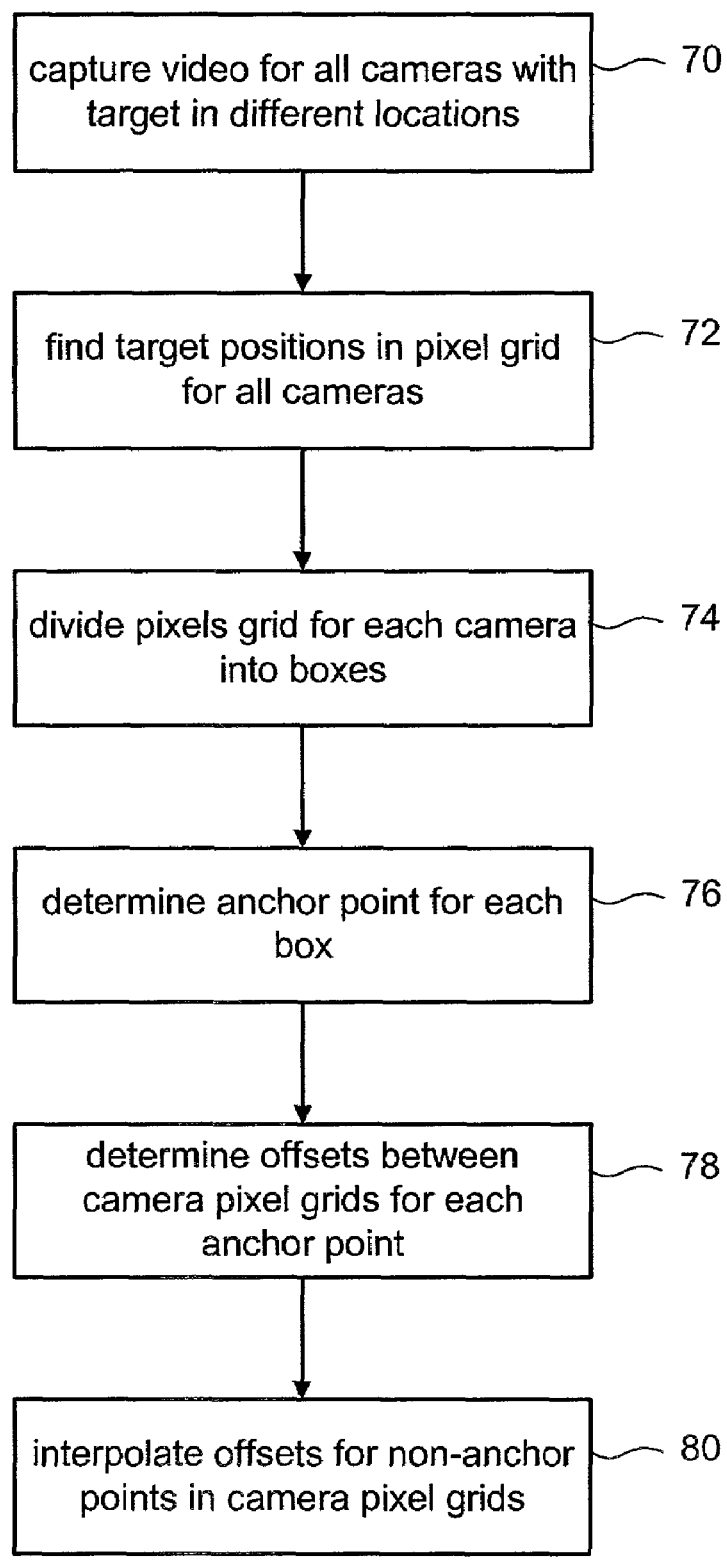
FIG. 2 is a flow chart describing one embodiment for calibrating the system of FIG. 1.

FIG. 2 is a flowchart describing one embodiment of a process for calibrating the components of FIG. 1. In step 70, the system will capture video of a target for all of the cameras. The target will be moved around so that the video captures the target in different locations. In one embodiment, a target can be a round object on a stick or string. Although not required, the target should be visually unique and/or easy to find in the video. In step 72 the system finds the positions of the target in the pixel grid for all the cameras. In one embodiment, step 72 can be performed manually with an operator clicking on the image of the target with a pointing device. In another embodiment, the target can be found using pattern recognition. In yet another embodiment, the target can be a unique color and the system can just search for pixels with that unique color.

In step 74 of FIG. 2, each of the pixel grids for each of the cameras is divided into a group of boxes (or other types of groups). In one embodiment, the boxes are 20 pixels wide and 20 pixels long. Other box sizes can also be used. In step 76, an anchor point is determined for each box. If a box only includes one pixel with an image of the target, then that pixel is the anchor point. If there are no pixels in a box with images of a target, then there is no anchor point in the box. If a box has multiple pixels with images of the target, then the positions of the pixels with images are averaged to derive an average position. That average position is the anchor point.

In step 78 of FIG. 2, the system determines the offsets for each of the anchor points. That is, the system looks at a box for a pixel grid in one camera and compares it to the corresponding box in the pixel grid for another camera. The positions of the anchor points for the two boxes are compared. It is likely that the two anchor points are at different positions. The difference in positions (in x and y directions) is the offset. For each anchor point in the pixel grid for camera 12, the system will determine an offset to the corresponding anchor point for camera 10 and an offset to the corresponding anchor point for camera 14.

In step 80, the system determines offsets for every other pixel that is not an anchor point. The offsets for the non-anchor point pixels are determined using interpolation between the anchor points. In one embodiment, the interpolation is a non-linear interpolation. Step 80 can be performed using an inverse distance function or Delauney triangles. At the end of the process of FIG. 2, the system has an offset value for every pixel in the camera pixel grids that indicate the offset between the grid of camera 10 and the grid of camera 12, as well as the offset between the grid of camera 12 and the grid of camera 14.

Figure 3:
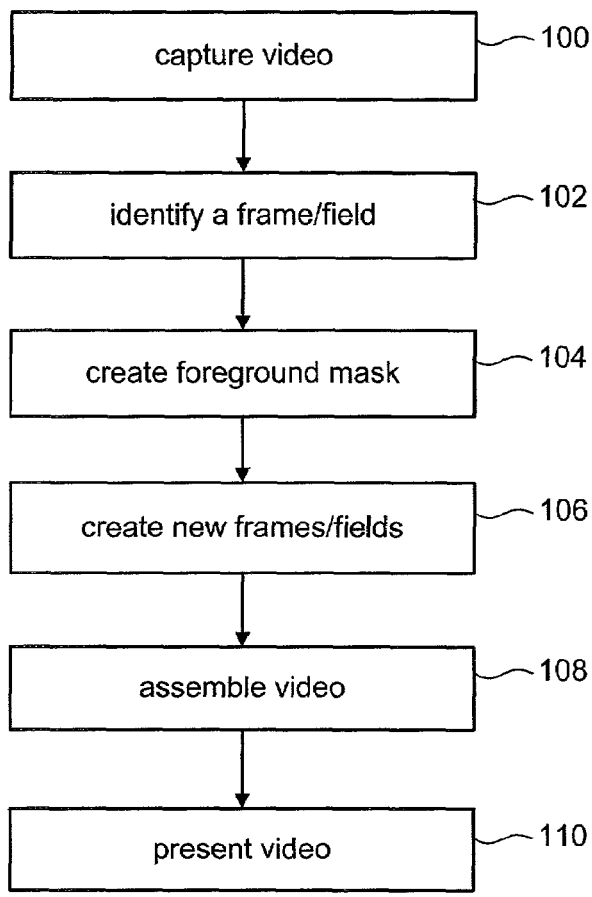
FIG. 3 is a flow chart describing one embodiment for operating the system of FIG. 1.

FIG. 3 is a flowchart describing one embodiment for operating the system of FIG. 1. In step 100, the cameras capture video of the scene of interest. In one embodiment, the cameras are stationary. By stationary, it is meant that they cannot pan or tilt. In another embodiment, the cameras are able to zoom. In another embodiment, the cameras can be panned, tilted or zoomed. The captured video is stored in circular buffers in computers 36, 38 and 40. In one embodiment, the cameras all have motors that can move the cameras (pan and tilt) in unison. Thus, the cameras will always be pointed to the same location in the scene of interest.

In step 102, an operator identifies a frame or field of video. In one embodiment, the operator watches the video from one camera (or all three cameras) and when the operator sees an image, field or frame of interest, the operator presses a button. This button can be a mechanical button or a button on a graphical user interface. In one embodiment, when the operator pushes the button, the current frame or field being displayed is the chosen field. In another embodiment, pushing a button causes a computer (e.g. computer 42) to display the field that was being displayed at the time the operator pushed the button and three fields before and after that field. In yet another embodiment, instead of showing three fields before and after, the interface can show the field at the time the button was pressed and five other fields, all of which are four fields apart. After one of the fields are chosen, the user interface shows six fields all one frame apart centered around the time of the previously selected field. In yet another embodiment, double clicking the button causes the system to choose the field currently being displayed and single clicking the button causes the system to display the six images as described above. At the end of step 102, a particular field is chosen. The chosen field will be used to create a virtual camera movement replay. Throughout this document, the discussion of the various steps refers to fields. However, the steps can also apply to frames and other units.

In step 104 of FIG. 3, a foreground mask is created. This foreground mask identifies what portion of the video is foreground and what part of the video is background. In one embodiment, the foreground mask is all black where there is foreground and clear (or empty or white) where there is background. A foreground mask is created for each camera. In step 102 discussed above, a field from one of the cameras was chosen. The field can be chosen from any one camera. Because each of the cameras have time codes, once a field is chosen from one of the cameras, the corresponding in time fields from the other two cameras can be identified using the time codes. Step 104 includes creating a foreground mask for all three fields (one field from each camera). Step 106 includes creating new fields. The new fields are in a sequence between the cameras. In one embodiment, 23 new fields are created to fit between the image from camera 10 and camera 12, and 23 new fields are created to fit between the image from cameras 12 and 14. The additional fields show the foreground at different angles in order to create the virtual camera motion. The new fields can be created using morphing, optical flow, voxel coloring, and other known methods.

Step 108 includes assembling the video. That is, the 46 fields that result from step 106 and the three original fields are assembled in order so that when the fields are viewed it appears that the camera is being moved around the foreground and the foreground appears frozen in time. In one embodiment, the movie could include adding additional fields. That is, each of the fields created in step 106 can be copied so that two of each, three of each, or more than three of each can be added to the video in step 108. Additionally, more or less than 23 fields can be created between each camera. In one embodiment, 22 fields are created between each camera. In step 110, the video is presented. For example, during a televised sporting event, step 110 could include showing a replay over broadcast television. Alternatively, step 110 could include adding the video assembled in step 108 to a full-length motion picture, videotape, etc. Any suitable means for showing the movie will work with the present invention. In other embodiments, presenting the video can include transmitting the video over the Internet or other medium.

Figure 4:
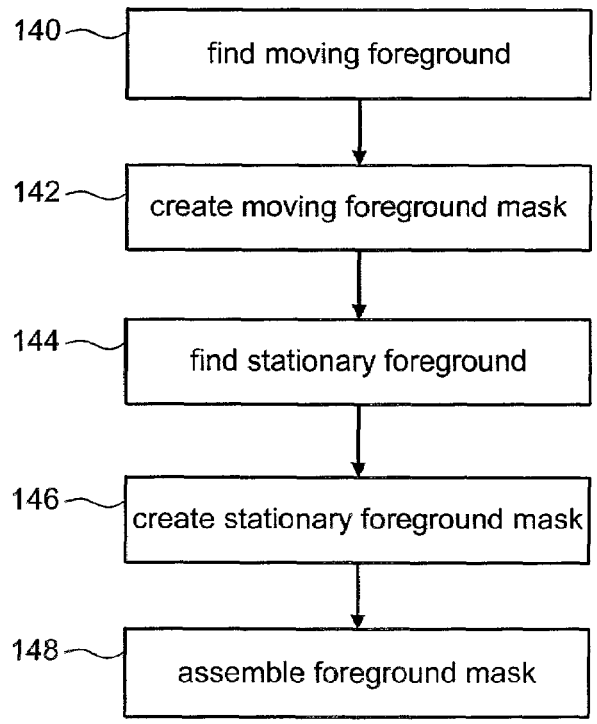
FIG. 4 is a flow chart describing one embodiment of the process for creating a foreground mask.

FIG. 4 is a flowchart describing one embodiment of the process for creating a foreground mask. In step 140, the system finds the moving objects of the foreground. In step 142, the system creates a moving foreground mask. The moving foreground mask identifies those portions of the video field that are moving. The foreground mask includes a black area for each part of the moving portion of the foreground. Step 140 finds moving objects in the foreground for a field from camera 10, a field from camera 12 and a field from camera 14. Step 142 creates a foreground mask for the field from camera 10, the field from camera 12 and associated field from camera 14. In step 144, the system finds the stationary portion of the foreground in the video. In step 146, the system creates a stationary foreground mask for each of the three fields. In one embodiment, step 144 can be performed by an operator manually selecting stationary portions of the video. In another embodiment, step 144 can be performed using pattern recognition to find known objects. In other embodiments, step 144 and step 146 can be skipped. It is assumed that in many sporting events, the foreground will only include moving objects. For example, during a soccer game, the foreground may only include soccer players and the ball. Any stationary object (including a stationary player) can be considered to be part of the background. In step 148, the complete foreground mask is assembled. In one embodiment, step 148 includes adding the stationary foreground mask to the moving foreground mask. In some embodiments that do not include a stationary foreground mask, steps 144–148 need not be performed.

FIG. 5 is a flowchart describing one embodiment of the process for finding the moving objects in the foreground (step 140 of FIG. 4). The process of FIG. 5 is performed once for each channel of each camera. Thus, if there are three cameras and the system is using RGB video, then the process of FIG. 5 can be performed nine times. The results for each channel are combined to create a composite result. The steps of FIG. 5 are performed for the field identified in step 102 and the fields from the other two cameras associated in time with the field identified in step 102. Note that formats other than RGB can also be used (e.g. YcrCb, etc.).

In step 200 of FIG. 5, the field currently under consideration is compared to one field immediately preceding in time and one field immediately subsequent in time. In other embodiments, more than one prior and post field can also be utilized. For example, considering 10 fields preceding may improve the method. The system performs a frame difference between the field under consideration and the field prior and the field post in time. Each frame difference involves subtracting each pixel in RGB space and computing the absolute value. Differences below a certain threshold value (e.g. 24) are discarded. The pixels remaining are areas in motion, noise, shadows or reflections. FIG. 6A shows three fields 302, 304 and 306. Field 304 is the field identified in step 102. Field 302 is one field prior to 304 and field 306 is one field post field 304. In one embodiment, all three fields are odd fields. In another embodiment, all three fields are even fields. Step 200 includes taking the absolute value of subtracting field 302 from 304 and taking the absolute value of subtracting field 306 from field 304. Results of the subtraction are shown in FIG. 6B. Field 340 is a result of subtracting field 304 and 302. Field 342 is the result of subtracting field 306 from field 304. In one alternative embodiment and in some situations, using prerecorded background images to find the foreground may also work.

In step 202, the difference fields (field 340 and field 342) are filtered to remove noise. In one embodiment the filter involves evaluating eight adjacent pixels and if all pixels are on or off then force the center pixel to be the same. An example of the result of filtering is shown in FIG. 6C. In step 204, the system creates groups or clusters of adjacent on/off pixels. In step 206, small 'on' clusters are removed. In step 208, small 'off' clusters are filled in to be on. Steps 206 and 208 reduce the possibility of including moving objects that are in the background. FIG. 6D shows fields 380 and 382, which are the result of steps 204, 206 and 208.

In step 210, the system creates a logical AND of the difference fields. That is, the system creates a logical AND of fields 380 and 382. FIG. 6E shows field 390, which is the result of a logical AND of fields 380 and 382. A pixel that is on in field 390 is considered to be in the foreground. In steps 214–220, field 390 is cleaned to remove noise and other artifacts. In step 214, clusters of adjacent on/off pixels are created (similar to step 204) for field 390. In step 216, small 'on' clusters are removed (similar to step 206) from field 390. In step 218, small 'off' clusters are filled in (similar to step 208). In step 220, edges of the foreground of field 390 are cleaned up. The results of the process of FIG. 5 identify the pixels to be used in the foreground mask.

There are several ways to create the new fields for the video showing the virtual camera motion. One simple method is to only display the foreground images and black out the background. A second approach includes inserting the foreground over a blurred and/or blended background image. A third option is to pre-map the background transformation before the game (or other event). The pre-mapping process could be manual, semi-manual or automatic.

Figure 7:
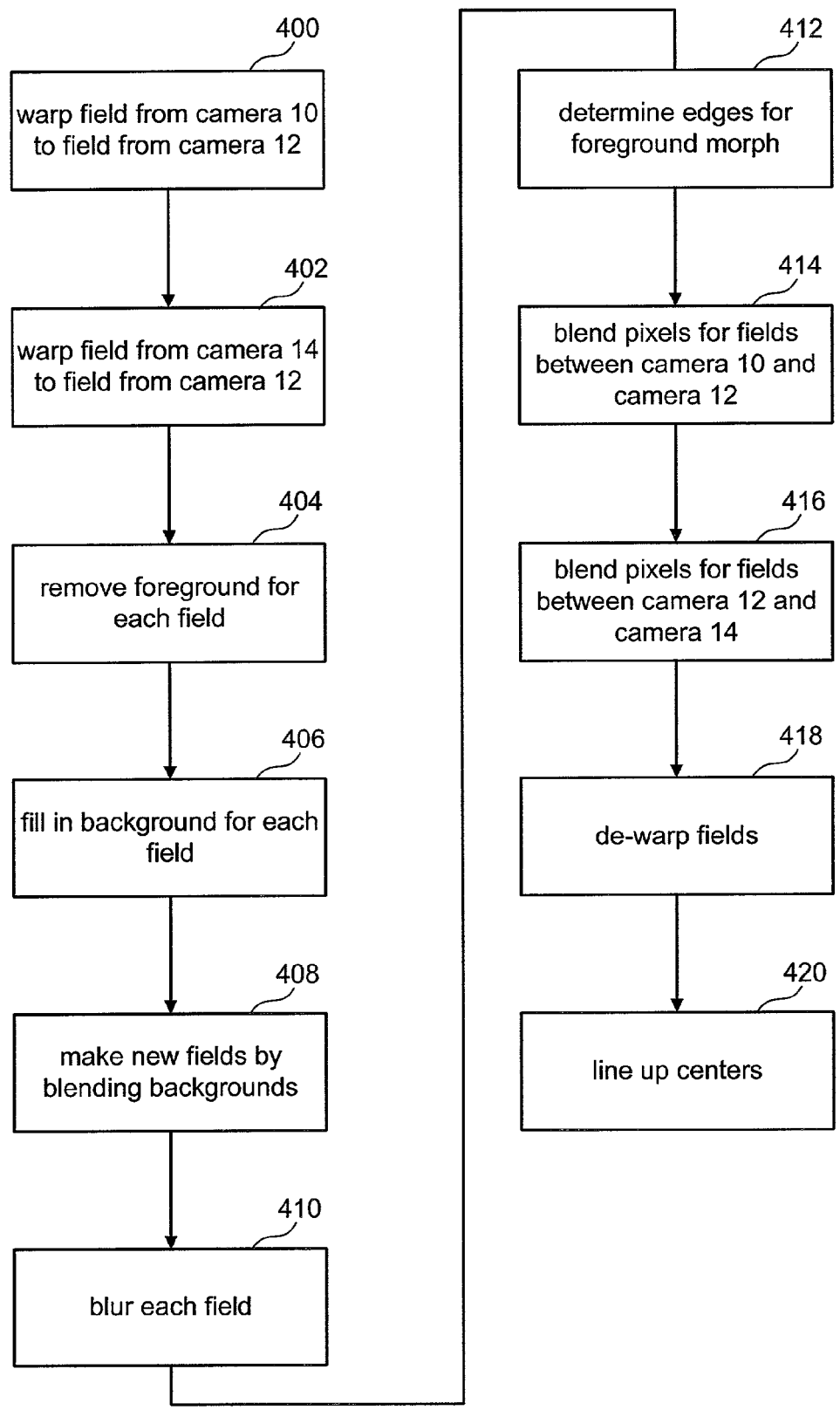
FIG. 7 is a flow chart describing one embodiment of the process for creating new fields.

FIG. 7 is a flowchart describing one embodiment of the process for creating new fields (step 106 of FIG. 3) where the background is blended and/or blurred. Other embodiments use a background that is not blended or blurred. In step 400, the field from camera 10 is warped to align with the field from camera 12. Remember that in the process of FIG. 2 offsets were determined for every pixel in the camera grid arrays. These offsets are used to warp the field from camera 10 to camera 12 in step 400. The offsets are also used to warp the field from camera 14 to camera 12 in step 402. In step 404, the foreground masks are used to remove the foreground from all three fields. The fields that are subjected to the process of FIG. 7 includes the field identified in step 102 of FIG. 3 and the two fields from the other cameras that are correspond in time based on the time codes.

When the foregrounds are removed, the pixels that used to represent the foreground now need to be given a color value. In one embodiment, the system takes an image of the scene prior to the event. This image would include the background but no foreground. In step 406, the pixels that previously represent the foreground are filled in based on this prior image of the background. Thus, any pixel that was in the foreground pixel is now filled in with the background from the prior image.

In step 408, the new fields are created. Twenty-three new fields are created that are to be inserted between the fields from camera 10 and camera 12. Each of these newly created fields is a blend between the field from camera 10 that had its background filled in step 406 and the field from camera 12 that had its background filled in step 406. Twenty-three new fields are created for insertion between the fields from camera 12 and camera 14. Each of these newly created fields is a blend between the field from camera 12 that had its background filled in step 406 and the field from camera 14 that had its background filled in step 406.

Table 1 below indicates how much from the field from camera 10 and how much from the field of camera 12 are blended into the relevant new fields. The Interpolation Fraction in Table 1 indicates the angle that the new field views the foreground as a relative percentage of the difference between the angle of view of camera 10 and the angle of view of camera 12. Thus, if camera 10 and camera 12 are 10 degrees apart, then field 2 with an Interpolation Factor of 0.01 is 0.1 degrees from the view of camera 10 and 9.9 degrees from the view of camera 12. When creating a pixel in field 2 during step 408, the pixel will be a blend of 99% the pixel from camera 10 and 1% the pixel from camera 12. Field 13 has an Interpolation Factor of 0.4; therefore, it will have an angle of view that is 40% of the difference between camera 10 and camera 12—which is four degrees from the view of camera 10 and six degrees from the view of camera 12. When creating a pixel in field 13 during step 408, the pixel will be a blend of 60% the pixel from camera 10 and 40% the pixel from camera 12. Thus (1−Iterpolation Fraction)*100% indicates the amount of blend from camera 10 and the (Interpolation Fraction)*100% indicates the amount of blend from camera 12.

Table 2 indicates how much from camera 12 and how much from camera 14 are blended into each of the relevant new fields. The Interpolation Fraction in Table 1 indicates the angle that the new field views the foreground as a relative percentage of the difference between the angle of view of camera 12 and camera 14. Thus, if camera 10 and camera 12 are 10 degrees apart, then field 2 of Table 2 with an Interpolation Factor of 0.05 is 0.5 degrees from the view of camera 12 and 9.5 degrees from the view of camera 14. When creating a pixel in field 2 during step 408, the pixel will be a blend of 95% the pixel from camera 12 and 5% the pixel from camera 14. Field 13 of Table 2 has an Interpolation Factor of 0.6; therefore, it will have an angle of view that is 60% of the difference between camera 12 and camera 14 which is six degrees from the view of camera 12 and four degrees from the view of camera 14. When creating a pixel in field 13 during step 408, the pixel will be a blend of 40% the pixel from camera 12 and 60% the pixel from camera 14. Thus (1−Interpolation Fraction)*100% indicates the amount of blend from camera 12 and the (Interpolation Fraction) *100% indicates the amount of blend from camera 14. Note that field 1 of Table 1 is the field from camera 10. Field 25 from Table 1 and field 1 from Table 2 are both the field from camera 12. Field 25 from Table 2 is the field from camera 14. The Interpolation Fraction can be thought of as an indication of the angle of view of the new field in relation to the angle of view of the fields from the camera.

TABLE 1

New Fields Between Camera 10 and Camera 12

| New Field No. | Blur Factor | Interpolation Fraction |
|---|---|---|
| 1 | 0 | 0 |
| 2 | 1 | 0.01 |
| 3 | 2 | 0.02 |
| 4 | 3 | 0.03 |
| 5 | 5 | 0.05 |
| 6 | 7 | 0.07 |
| 7 | 9 | 0.10 |
| 8 | 9 | 0.15 |
| 9 | 9 | 0.20 |
| 10 | 9 | 0.25 |
| 11 | 9 | 0.30 |
| 12 | 9 | 0.35 |
| 13 | 9 | 0.40 |
| 14 | 9 | 0.45 |
| 15 | 9 | 0.50 |
| 16 | 9 | 0.55 |
| 17 | 9 | 0.60 |
| 18 | 9 | 0.65 |
| 19 | 9 | 0.70 |
| 20 | 9 | 0.75 |
| 21 | 9 | 0.80 |
| 22 | 9 | 0.85 |
| 23 | 9 | 0.90 |
| 24 | 9 | 0.95 |
| 25 | 9 | 1.0 |

TABLE 2

New Fields Between Camera 12 and Camera 14

| New Field No. | Blur Factor | Interpolation Fraction |
|---|---|---|
| 1 | 9 | 0 |
| 2 | 9 | 0.05 |
| 3 | 9 | 0.10 |
| 4 | 9 | 0.15 |
| 5 | 9 | 0.20 |
| 6 | 9 | 0.25 |
| 7 | 9 | 0.30 |
| 8 | 9 | 0.35 |
| 9 | 9 | 0.40 |
| 10 | 9 | 0.45 |
| 11 | 9 | 0.50 |
| 12 | 9 | 0.55 |
| 13 | 9 | 0.60 |
| 14 | 9 | 0.65 |
| 15 | 9 | 0.70 |
| 16 | 9 | 0.75 |
| 17 | 9 | 0.80 |
| 18 | 9 | 0.85 |
| 19 | 9 | 0.90 |
| 20 | 7 | 0.93 |
| 21 | 5 | 0.95 |
| 22 | 3 | 0.97 |
| 23 | 2 | 0.98 |
| 24 | 1 | 0.99 |
| 25 | 0 | 1.0 |

In step 410, each of the fields created in step 408 and the three fields that resulted from step 406 are blurred. In one embodiment, blurring includes replacing each pixel's color by the average of that pixel's color and a number of surrounding pixels on a scan line. The number of surrounding pixels considered when blurring is called the Blur Factor. If the Blur Factor is nine, then blurring includes replacing each pixels color by the average of that pixel's color and the color of nine surrounding pixels on the scan line. In one embodiment, the fields are blurred by different Blur Factors. For one embodiment, each of the Blur Factors for the specific fields is identified in Tables 1 and 2. Other schemes for blurring can also be used.

In step 412 of FIG. 7, the system determines the edges for the foreground morph. This is all the edges in the foreground that will be used in the process of morphing the foreground for the newly created fields. In step 414, pixels from camera 10 are blended with pixels from camera 12 to create the morph of the foreground for the new fields between cameras 10 and 12. In step 416, pixels from camera 12 are blended with pixels from camera 14 to create the morph of the foreground for the new fields between cameras 12 and 14. In step 418, each of the fields are de-warped. Remember that the original fields were warped in step 400 and 402 by using the offsets. Step 418 de-warps all the fields including the newly created fields. The original two fields warped in steps 400 and 402 are de-warped by the same offsets used to warp. The newly created fields are warped by a fraction of those offsets corresponding to the appropriate Interpolation Fraction in Tables 1 and 2. In step 420, the centers of the fields are lined up. That is, the center of the field for camera 12 is determined to be the center and all other fields are adjusted so that the images line up.

Figure 8:
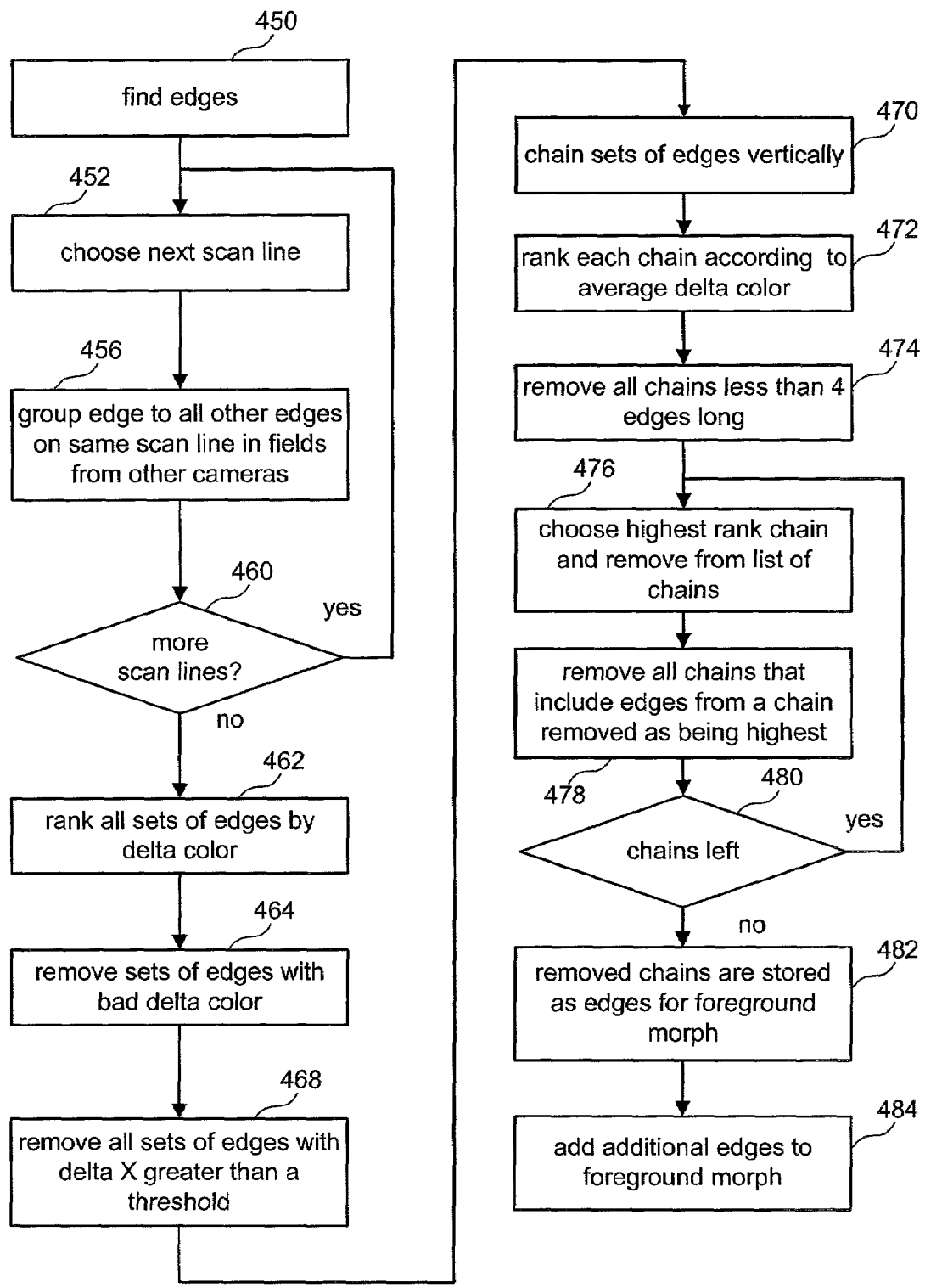
FIG. 8 is a flow chart describing one embodiment of the process for determining the edges for the foreground morph.

FIG. 8 is a flowchart describing one embodiment of the process of determining the edges of the foreground morph (step 412 of FIG. 7). In step 450, the system finds the edges of the foreground images in the fields under consideration from cameras 10, 12 and 14. There are many suitable methods known in the art for detecting edges. One suitable example is the Sobel algorithm. In step 452 a scan line is chosen. In step 456, the edges on the current scan for all three fields are grouped into all possible permutations of sets of three edges, where each set of three edges includes one edge from each of the three fields (one from each camera). If, in step 460, there are more scan lines to consider then the method loops back to step 452; otherwise, the method continues to step 462

In step 462, all of the sets of three edges are ranked by the delta color. Delta color is the value represented by subtracting the color values for the edges. Each set of three edges will have two delta color values: one delta color for comparing the edge from camera 10 to the edge from camera 12 and a second delta color for comparing the edge from camera 12 to the edge from camera 14. In one embodiment, the delta color value is the average of the difference in the red value, the difference in the green value and the difference in the blue value for eight pixels on both sides of the edge. In another embodiment, the delta color value can be the sum of the differences between the R value, the G value and the B value for pixels on both sides of the edge. A particular set of three edges is ranked by its highest (e.g. biggest differential) of the two delta colors. In step 464, sets of three edges with bad delta color values are removed from the rank list. In one embodiment, a bad delta color is a delta color that is greater than 100.

In step 468, the delta x values are calculated for each set of three edges that remain after step 464. The delta x value represents a difference in the x position along the scan line between the edge in one camera and the edge in the other camera. Thus, each set of three edges has two delta x values: one delta x value representing the difference in x coordinates between the edge in camera 10 and the edge in camera 12, and a second delta x value representing the difference in x coordinates between the edge in camera 4 and the edge in camera 12. Step 468 includes removing all sets of three edges from the ranked list where the two delta x values for a given set differ by more than a threshold. In one embodiment, that threshold is ten pixels.

In step 470, the sets of edges remaining after step 468 are chained vertically with other sets of edges. However, a first set can only be chained with a second set if (1) the edge from camera 10 for the first set has the same x pixel position or within one x pixel position in the pixel grid as the edge from camera 10 for the second set, (2) the edge from camera 12 for the first set has the same x pixel position or within one x pixel position in the pixel grid as the edge from camera 12 for the second set, and (3) the edge from camera 14 for the first set has the same x pixel position or within one x pixel position in the pixel grid as the edge from camera 14 for the second set. In step 472, the chains are ranked according to delta color. In one embodiment, the two delta colors for a set of three edges are averaged, the averages of each set on a chain are averaged and the chains ranked according to the latter average. In another embodiment, the two delta colors for a set of three edges are averaged and the chain is ranked according to the highest average (which is the least favorable match). In step 474, all chains that are less than four edges long (e.g. have less than four sets) are removed from the list of chains.

In step 476, the chain with the highest ranking (the best matching chain) is removed from the list of chains and put into a list of removed chains. In step 478, all chains that include any edge that is already part of the chain removed in step 476 are discarded. In step 480, it is determined whether there any more chains left in the list of ranked chains created in step 472. If there are chains left, the method loops back to step 476. If there are no more chains left, then the process moves to step 482. At step 482, there is a list of chains that have been removed in the iterations of step 476. These removed chains are stored as edges for the foreground morph. In step 484, additional edges are added to the foreground morph.

Figure 9:
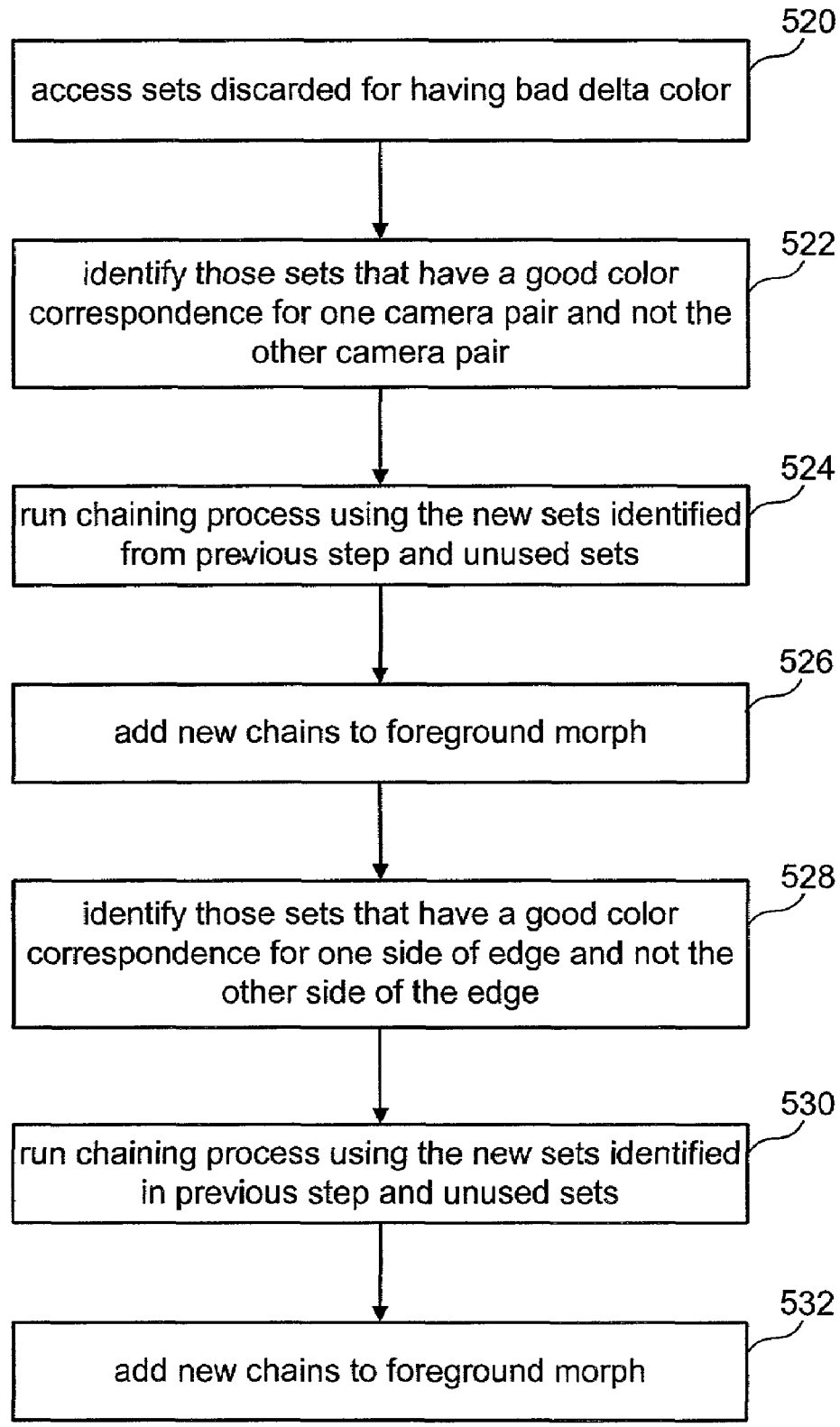
FIG. 9 is a flow chart describing one embodiment of the process for adding additional edges to the foreground morph.

FIG. 9 is a flowchart describing the process of adding additional edges to the foreground morph (step 484 of FIG. 8). In step 520, the system accesses all the sets of three edges that were discarded in step 464 as having a bad delta color. In step 522, the system determines which of those sets have a good delta color for one camera pair and not the other camera pair. An exemplar good delta color value is 50 or better. In step 524, the chaining process of FIG. 8 (steps 470–482) is performed again using the sets identified in step 522, and any set of three edges that was not removed in step 464 and is not in a chain that is part of the foreground morph. The new chains identified by step 524 (e.g. the chains removed as being the highest ranked chains) are added to the foreground morph in step 526.

In step 528, the system identifies those sets of three edges that were removed in step 464 and that have good color correspondence for one side of the edge but do not have a good color correspondence for the other side of the edge. A good color correspondence includes a value of 25 or better. In step 530 the chaining process is run again with the new sets identified in step 528, and any set of three edges that was not removed in step 464 and is not in a chain that is part of the foreground morph. In step 532, the new chains identified by step 530 (e.g. the chains removed as being the highest ranked chains) are added to the foreground morph.

Figure 10:
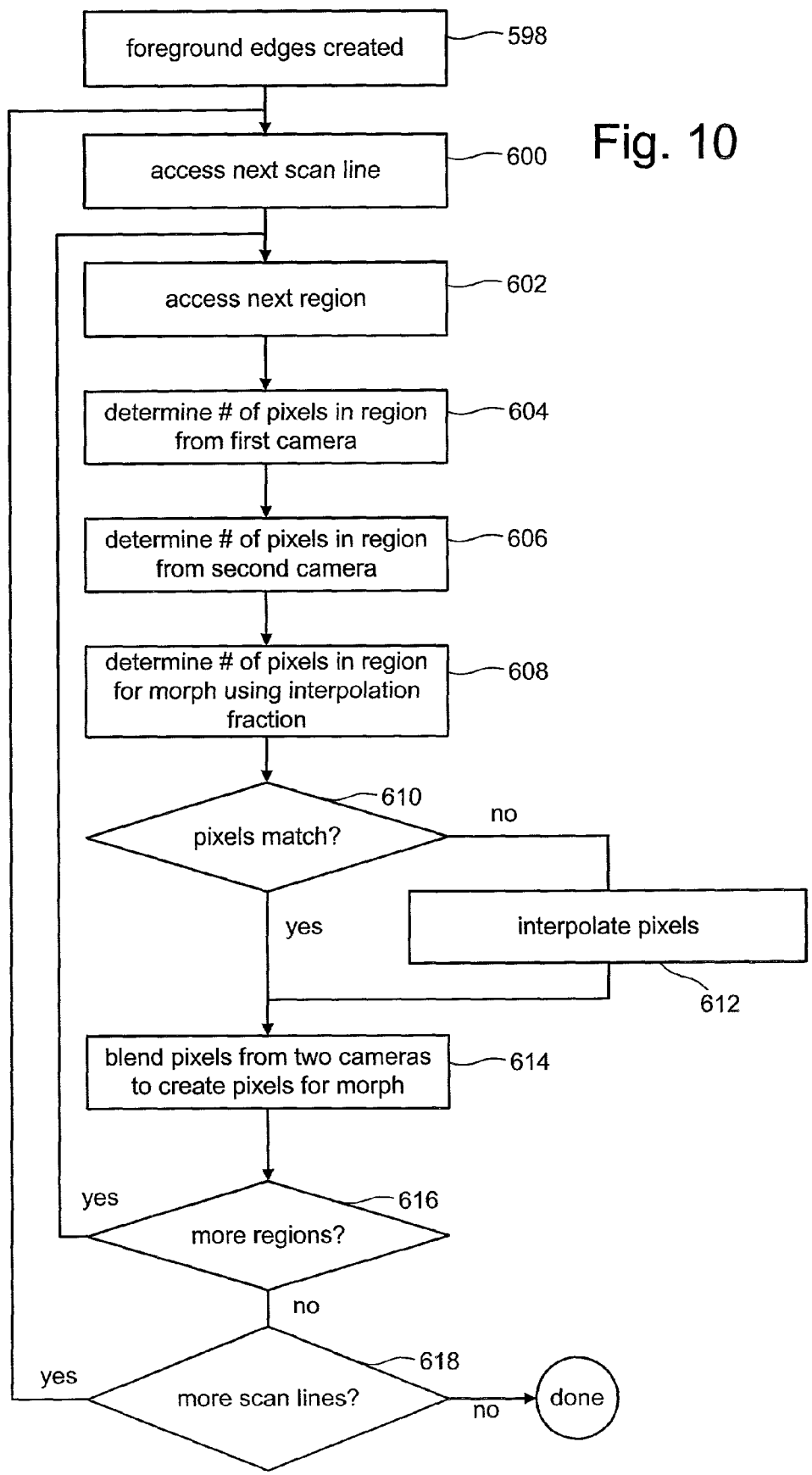
FIG. 10 is a flow chart describing one embodiment of the process blending pixels from two cameras to create a new field.

FIG. 10 is a flowchart describing one embodiment of the process of blending pixels from two cameras to create a morphed image in a particular field. FIG. 7 includes steps 414 (blending pixels from cameras 10 and 12 to create new fields) and step 416 (blending pixels from cameras 12 and 14 to create new fields). The process of FIG. 10 describes the process used to create one of those new fields created in steps 414 or 416. The process of FIG. 10 is performed for each new field.

In step 598, the foreground edges for the particular field under consideration are created. Step 598 includes accessing the chains of sets of edges for the foreground morph. The sets of edges indicate how the foreground edge moves between the cameras. This information includes the edges position in all three cameras (or two of the cameras). Step 598 includes interpolating the position of the edge into the current field. The position of the edge in the current field being created will be interpolated between the position of the edge in the fields from two cameras according to the Interpolation Fractions from Tables 1 and 2. For example, if field 20 between cameras 10 and 12 is being created (see Table 1), then the edge is interpolated to be seventy five percent of the way from the edge position in camera 10 to the edge position in camera 12.

In step 600 the next scan line for the new field being created is accessed. If this is the first time that step 600 is being performed, then the first scan line is accessed. In step 602, the next region of the scan line accessed. If this is the first time that step 602 is being performed for a particular scan line, then the first region is accessed in step 602. A region is an area of the scan line between any two foreground edges.

In the step 604, the system determines the number of pixels in the region of the field (see step 102) from the first camera. In step 606, the system determines the number of pixels in the region from the field (see step 102) of the second camera. In step 608, the system determines the number of pixels in the region for the newly created field. In step 610, it is determined whether the number of pixels in the newly created field is the same as the number of pixels in the region for the other two cameras. If so, the method loops to step 614. If the number of pixels in the regions are different, than the system interpolates pixels in step 612.

In step 612, for each pixel in the region for the newly created field a pixel or interpolated pixel must exist in the regions of the fields from the two cameras. If extra pixels exist in the regions of the fields of the two cameras, then the system averages the pixels to create the corresponding interpolated smaller set of one or more pixels. Alternatively, the system can choose to ignore pixels in the original field. If the region in the fields of the camera has less pixels than the region for the newly created field, then the system interpolates to create interpolated pixels. For example, if the newly created field has a subregion of five pixels and the region in one of the original cameras only has three pixels, then the system has to interpolate to create two new pixels for the original field. These two new pixels will be an average—e.g. original pixels=(100, 80, 100) and interpolated pixels=(100, 90, 80, 90, 100).

In step 614, pixels from the region in one of the cameras is blended with pixels from the region from the other camera according to the Interpolation Fraction for the particular field (see Tables 1 and 2). For example, when creating field 20 according to Table 1, a new pixel will be a blend of 75% of the pixel from camera 12 and 25% of the pixel from camera 10. In step 616, it is determined whether there are more regions on the particular scan line. If there are more regions, the method loops back to step 602. If there are no more regions, then in step 618 it is determined whether there are more scan lines to consider. If there are more scan lines to consider for the newly created field, then the method loops back to step 600. If there are no more scan lines, then the method is done.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A machine implemented method for producing virtual camera motion, comprising:
   receiving a set of two or more images of a scene;
   identifying foreground for at least a subset of said images of said scene; and
   creating a video of said scene conveying an illusion of a camera moving around said scene, said step of creating a video is based on said set of two or more images and said step of identifying foreground, wherein said step of identifying foreground comprises the steps of,
   subtracting a first image of said scene from a second image of said scene to create a first difference, said first image and said second image are from a first camera,
   subtracting a third image of said scene from said second image to create a second difference, said third image is from said first camera, and
   creating a union of said first difference and said second difference, said union identifies said foreground.

2. A method according to claim 1, wherein said step of identifying further comprises the steps of:
   creating clusters of on pixels in said first difference;
   creating clusters of off pixels in said first difference;
   removing small clusters of on pixels in said first difference;
   filling in small clusters of off pixels in said first difference;
   creating clusters of on pixels in said second difference;
   creating clusters of off pixels in said second difference;
   removing small clusters of on pixels in said second difference; and
   filling in small clusters of off pixels in said second difference.

3. A method according to claim 2, wherein said step of identifying further comprises the steps of:
   filtering said first difference;
   filtering said second difference; and
   filtering said union.

4. A method according to claim 2, wherein said step of identifying further comprises the steps of:
   creating clusters of on pixels in said union;
   creating clusters of off pixels in said union;
   removing small clusters of on pixels in said union; and
   filling in small clusters of off pixels in said union.

5. A machine implemented method for producing virtual camera motion, comprising:
   receiving a set of two or more images of a scene;
   identifying foreground for at least a subset of said images of said scene; and
   creating a video of said scene conveying an illusion of a camera moving around said scene, said step of creating a video is based on said set of two or more images and said step of identifying foreground, wherein,
   said step of receiving includes receiving a first video image, a second video image and a third video image,
   said first video image views a foreground object at a first angle,
   said second video image views said foreground object at a second angle,
   said third video image views said foreground object at a third angle,
   said step of creating a video includes creating a first set of one or more new video images and a second set of one or more video images,
   said first set of one or more video images appear to view said foreground object at angles between said first angle and said second angle,
   said second set of one or more video images appear to view said foreground object at angles between said second angle and said third angle, and
   said video includes said first set of one or more video images and said second set of one or more video images.

6. A method according to claim 5, wherein:
   said video further includes at least a portion of said first video image prior to said first set of one or more video images, at least a portion of said second video image prior to said second set of one or more video images and at least a portion of said third video image subsequent to said second set of one or more video images.

7. A method according to claim 5, wherein said step of creating a video includes the step of:
   creating one or more blurred backgrounds based on said step of identifying foreground, said first set of one or more video images and second set of one or more video images include said blurred backgrounds.

8. A method according to claim 5, wherein said step of creating a video includes the step of:
   creating one or more solid backgrounds based on said step of identifying foreground, said first set of one or more video images and second set of one or more video images include said solid backgrounds.

9. A method according to claim 5, wherein said step of creating a first set of one or more video images comprises the steps of:
   blending said first video image with said second image using different blending factors to create different backgrounds for said first set of one or more video images; and
   blurring said backgrounds of said first set one or more video images using different blurring factors for at least a subset of said one or more video images.

10. A method according to claim 9, wherein said step of identifying foreground comprises the steps of:
    subtracting a fourth video image from said first video image to create a first difference, said fourth video image and said second video image are from a first camera;
    subtracting a fifth video image from said second video image to create a second difference, said fifth image is from said first camera; and
    creating a union of said first difference and said second difference, said union identifies said foreground.

11. A method according to claim 5, wherein creating a first set of one or more video images comprises the steps of:
    finding edges in said first video image;
    finding edges in said second video image;
    finding edges in said third video image;

creating matches of at least portions of edges in said first video image, said second video image and said third video image;
creating chains of said matches;
discarding bad chains; and
creating morphs of at least a portion of said first video image and said second video image based on said chains.

12. A method according to claim 5, wherein creating a first set of one or more video images comprises the steps of:
identifying edges in said first video image and said second video image;
interpolating positions for said edges in said first set of one or more video images; and blending regions of said first video image between said edges with regions of said second video image between said edges according to different blending factors for each of said first set of one or more new video images, said blending factors correlate to said interpolated positions.

13. A method for producing virtual camera motion, comprising the steps of:
receiving a set of two or more images of a scene;
identifying foreground for at least a subset of said images of said scene; and
creating a video of said scene conveying an illusion of a camera moving around said scene, said step of creating a video is based on said set of two or more images and said step of identifying foreground, wherein said step of creating a video comprises the steps of,
warping a first image from a first camera to a second image from a second camera;
warping a third image from a third camera to said second image from said second camera;
removing foregrounds from said first image, said second image and said third image;
filling in background for said removed foreground in said first image, said second
image and said third image;
creating new images by blending backgrounds of said first image with said second image and said second image with said third image;
blurring said new images;
morphing said removed foregrounds;
adding said morphed foregrounds to said new images; and
unwarping said new images.

14. A method for producing virtual camera motion, comprising the steps of:
receiving a set of two or more images of a scene;
identifying foreground for at least a subset of said images of said scene; and
creating a video of said scene conveying an illusion of a camera moving around said scene, said step of creating a video is based on said set of two or more images and said step of identifying foreground, wherein said step of creating includes the steps of,
creating one or more video images having blurred backgrounds based on said step of identifying foreground; and
assembling said created one or more video images into said video.

15. A method for producing virtual camera motion, comprising the steps of:
receiving a set of two or more images of a scene;
identifying foreground for at least a subset of said images of said scene; and creating a video of said scene conveying an illusion of a camera moving around said scene, said step of creating a video is based on said set of two or more images and said step of identifying foreground, wherein said step of creating includes the steps of,
creating one or more video images by blending a first image from a first camera with a second image from a second camera using different blending factors to create different backgrounds for said one or more video images;
blurring said backgrounds of said one or more video images using different blurring factors for at least a subset of said one or more video images; and
assembling said created one or more video images into said video.

16. A method for producing virtual camera motion, comprising the steps of:
receiving a set of two or more images of a scene;
identifying foreground for at least a subset of said images of said scene; and
creating a video of said scene conveying an illusion of a camera moving around said scene, said step of creating a video is based on said set of two or more images and said step of identifying foreground, wherein said step of creating includes the steps of,
creating one or more video images having solid backgrounds based on said step of identifying foreground, said video includes said video images having solid backgrounds; and
assembling said created one or more video images into said video.

17. A method for producing virtual camera motion, comprising the steps of:
receiving a set of two or more images of a scene;
identifying foreground for at least a subset of said images of said scene; and
creating a video of said scene conveying an illusion of a camera moving around said scene, said step of creating a video is based on said set of two or more images and said step of identifying foreground, wherein said step of creating comprises the steps of,
finding edges in a first video image from a first camera;
finding edges in a second video image from a second camera;
finding edges in a third video image from a third camera;
creating matches of at least portions edges in said first video image, said second video image and said third video image;
creating chains of said matches;
discarding bad chains;
creating morphs of at least a portion of said first video image and said second video image based on said chains;
creating a new set of video images, adding said morphs to said new set of video images; and
assembling said new set of images into said video.

18. A machine implemented method for producing virtual camera motion, comprising the steps of:
receiving two or more images of a scene which view a foreground object from a first set of different angles;
identifying foreground for said two or more images of said scene; and
creating one or more new images of said scene based on said two or more images and step of identifying, said new images appear to view said foreground object from new angles different than said first set of different angles.

19. A method according to claim 18, wherein said step of identifying foreground comprises the steps of:
   subtracting a first image of said scene from a second image of said scene to create a first difference, said first image and said second image are from a first camera;
   subtracting a third image of said scene from said second image to create a second difference, said third image is from said first camera; and
   creating a union of said first difference and said second difference, said union identifies said foreground.

20. A method according to claim 18, further comprising the step of:
   assembling said new images of said scene into a movie that conveys the illusion of a camera moving around said scene as said scene appears frozen in time.

21. A method according to claim 18, wherein:
   said one or more video images are created with blurred backgrounds based on said step of identifying foreground.

22. A method according to claim 18, wherein said step of creating one or more new images comprises the steps of:
   creating said one or more new images by blending a first image from a first camera with a second image from a second camera using different blending factors to create different backgrounds for said one or more new images;
   blurring said backgrounds of said one or more new images using different blurring factors for at least a subset of said one or more new images; and
   assembling said created one or more video images into a video.

23. A method according to claim 18, wherein said step of creating one or more new images comprises the steps of:
   creating said one or more new images having solid backgrounds based on said step of identifying foreground; and
   assembling said created one or more video images into said video.

24. A method according to claim 18, wherein said step of creating one or more new images comprises the steps of:
   finding edges in a first video image from a first camera, said two or more images of a scene include said first video image;
   finding edges in a second video image from a second camera, said two or more images of a scene include said second video image;
   finding edges in a third video image from a third camera, said two or more images of a scene include said third video image;
   creating matches of at least portions edges in said first video image, said second video image and said third video image;
   creating chains of said matches;
   discarding bad chains;
   creating morphs of at least a portion of said first video image and said second video image based on said chains;
   creating a new set of video images, adding said morphs to said new set of video images; and
   assembling said new set of images into a video.

25. A machine implemented method for identifying foreground, comprising the steps of:
   receiving a first image from a first camera;
   receiving a second image from said first camera;
   receiving a third image from said first camera;
   subtracting said second image from said first image to create a first difference
   subtracting said third image from said first image to create a second difference; and
   creating a union of said first difference and said second difference, said union identifies said foreground.

26. A method according to claim 25, further comprising the steps of:
   creating clusters of on pixels in said first difference;
   creating clusters of off pixels in said first difference;
   removing small clusters of on pixels in said first difference;
   filling in small clusters of off pixels in said first difference;
   creating clusters of on pixels in said second difference;
   creating clusters of off pixels in said second difference;
   removing small clusters of on pixels in said second difference; and
   filling in small clusters of off pixels in said second difference.

27. A method according to claim 26, further comprising the steps of:
   filtering said first difference;
   filtering said second difference; and
   filtering said union.

28. A method according to claim 26, further comprising the steps of:
   creating clusters of on pixels in said union;
   creating clusters of off pixels in said union;
   removing small clusters of on pixels in said union; and
   filling in small clusters of off pixels in said union.

29. One or more processor readable storage devices having processor readable code embodied on said processor readable storage devices, said processor readable code for programming one or more processors to perform a method comprising the steps of:
   receiving a set of two or more images of a scene;
   identifying foreground for at least a subset of said images of said scene; and
   creating a video of said scene conveying an illusion of a camera moving around said scene, said step of creating a video is based on said set of two or more images and said step of identifying foreground, wherein said step of identifying foreground comprises the steps of,
      subtracting a first image of said scene from a second image of said scene to create a first difference, said first image and said second image are from a first camera;
      subtracting a third image of said scene from said second image to create a second difference, said third image is from said first camera; and
      creating a union of said first difference and said second difference, said union identifies said foreground.

30. One or more processor readable storage devices having processor readable code embodied on said processor readable storage devices, said processor readable code for programming one or more processors to perform a method comprising the steps of:
   receiving a set of two or more images of a scene;
   identifying foreground for at least a subset of said images of said scene; and
   creating a video of said scene conveying an illusion of a camera moving around said scene, said step of creating a video is based on said set of two or more images and said step of identifying foreground, wherein said step of creating includes the steps of, creating one or more video images having blurred backgrounds based on said step of identifying foreground; and
assembling said created one or more video images into said video.

31. One or more processor readable storage devices having processor readable code embodied on said processor readable storage devices, said processor readable code for programming one or more processors to perform a method comprising the steps of:
receiving a set of two or more images of a scene;
identifying foreground for at least a subset of said images of said scene; and
creating a video of said scene conveying an illusion of a camera moving around said scene, said step of creating a video is based on said set of two or more images and said step of identifying foreground, wherein said step of creating includes the steps of,
creating one or more video images by blending a first image from a first camera with a second image from a second camera using different blending factors to create different backgrounds for said one or more video images;
blurring said backgrounds of said one or more video images using different blurring factors for at least a subset of said one or more video images; and
assembling said created one or more video images into said video.

32. One or more processor readable storage devices having processor readable code embodied on said processor readable storage devices, said processor readable code for programming one or more processors to perform a method comprising the steps of:
receiving a set of two or more images of a scene;
identifying foreground for at least a subset of said images of said scene; and
creating a video of said scene conveying an illusion of a camera moving around said scene, said step of creating a video is based on said set of two or more images and said step of identifying foreground, wherein said step of creating comprises the steps of,
finding edges in a first video image from a first camera;
finding edges in a second video image from a second camera;
finding edges in a third video image from a third camera;
creating matches of at least portions edges in said first video image, said second video image and said third video image;
creating chains of said matches;
discarding bad chains;
creating morphs of at least a portion of said first video image and said second video image based on said chains;
creating a new set of video images, adding said morphs to said new set of video images; and
assembling said new set of images into said video.

33. One or more processor readable storage devices having processor readable code embodied on said processor readable storage devices, said processor readable code for programming one or more processors to perform a method comprising the steps of:
receiving a set of two or more images of a scene;
identifying foreground for at least a subset of said images of said scene; and
creating a video of said scene conveying an illusion of a camera moving around said scene, said step of creating a video is based on said set of two or more images and said step of identifying foreground, wherein said step of creating a video comprises the steps of,
warping a first image from a first camera to a second image from a second camera;
warping a third image from a third camera to said second image from said second camera;
removing foregrounds from said first image, said second image and said third image;
filling in background for said removed foreground in said first image, said second image and said third image;
creating new images by blending backgrounds of said first image with said second image and said second image with said third image;
blurring said new images;
morphing said removed foregrounds;
adding said morphed foregrounds to said new images; and
unwarping said new images.

34. An apparatus, comprising:
a communication interface;
one or more storage devices; and
one or more processors in communication with said one or more storage devices and said communication interface, said one or more processors receive a set of two or more images of a scene, identify foreground for at least a subset of said images of said scene, and create a video of said scene conveying an illusion of a camera moving around said scene frozen in time, said creating said video is based on said set of two or more images and said step of identifying foreground.

35. An apparatus according to claim 34, wherein said one or more processors subtract a first image of said scene from a second image of said scene to create a first difference, said first image and said second image are from a first camera, subtract a third image of said scene from said second image to create a second difference, said third image is from said first camera, and create a union of said first difference and said second difference, said union identifies said foreground.

36. An apparatus according to claim 34, wherein said one or more processors create one or more video images by blending a first image from a first camera with a second image from a second camera using different blending factors to create different backgrounds for said one or more video images, blur said backgrounds of said one or more video images using different blurring factors for at least a subset of said one or more video images, and assemble said created one or more video images into said video.

37. An apparatus according to claim 36, further comprising:
three cameras;
camera control electronics connected to said camera;
synchronization electronics in communication with said camera control electronics; and
one or more time code inserters in communication with said camera control electronics and said processor, said cameras capture said two or more images of said scene, said time code inserters insert time codes into said two or more images of said scene including said first image and said second image, said step of creating one or more video images by blending uses said time codes in said first image and said second image.

38. An apparatus according to claim 34, wherein said one or more processors create one or more video images having blurred backgrounds based on said identified foreground, and assemble said created one or more video images into said video.

39. One or more processor readable storage devices having processor readable code embodied on said processor readable storage devices, said processor readable code for programming one or more processors to perform a method comprising the steps of:
receiving two or more images of a scene which view a foreground object from a first set of different angles;
identifying foreground for said two or more images of said scene; and
creating one or more new images of said scene based on said two or more images and step of identifying, said new images appear to view said foreground object from new angles different than said first set of different angles.

40. One or more processor readable storage devices according to claim 39, wherein said step of identifying foreground comprises the steps of:
subtracting a first image of said scene from a second image of said scene to create a first difference, said first image and said second image are from a first camera;
subtracting a third image of said scene from said second image to create a second difference, said third image is from said first camera; and
creating a union of said first difference and said second difference, said union identifies said foreground.

41. One or more processor readable storage devices according to claim 39, wherein said method further comprises the step of:
assembling said new images of said scene into a movie that conveys the illusion of a camera moving around said scene as said scene appears frozen in time.

42. One or more processor readable storage devices according to claim 39, wherein said step of creating one or more new images comprises the steps of:
creating said one or more new images by blending a first image from a first camera with a second image from a second camera using different blending factors to create different backgrounds for said one or more new images;
blurring said backgrounds of said one or more new images using different blurring factors for at least a subset of said one or more new images; and
assembling said created one or more video images into a video.

43. One or more processor readable storage devices according to claim 39, wherein said step of creating one or more new images comprises the steps of:
finding edges in a first video image from a first camera, said two or more images of a scene include said first video image;
finding edges in a second video image from a second camera, said two or more images of a scene include said second video image;
finding edges in a third video image from a third camera, said two or more images of a scene include said third video image;
creating matches of at least portions edges in said first video image, said second video image and said third video image;
creating chains of said matches;
discarding bad chains;
creating morphs of at least a portion of said first video image and said second video image based on said chains;
creating a new set of video images, adding said morphs to said new set of video images; and
assembling said new set of images into a video.

44. An apparatus, comprising:
a communication interface;
one or more storage devices; and
one or more processors in communication with said one or more storage devices and said communication interface, said one or more processors receive two or more images of a scene which view a foreground object from a first set of different angles, identify foreground for said two or more images of said scene, and create one or more new images of said scene based on said two or more images and said identify, said new images appear to view said foreground object from new angles different than said first set of different angles.

45. An apparatus according to claim 44, wherein said one or more processors subtract a first image of said scene from a second image of said scene to create a first difference, said first image and said second image are from a first camera, subtract a third image of said scene from said second image to create a second difference, said third image is from said first camera, and create a union of said first difference and said second difference, said union identifies said foreground.

46. An apparatus according to claim 44, wherein said one or more processors create said one or more new images by blending a first image from a first camera with a second image from a second camera using different blending factors to create different backgrounds for said one or more new images, blur said backgrounds of said one or more new images using different blurring factors for at least a subset of said one or more new images, and assemble said created one or more video images into a video.

47. An apparatus according to claim 46, further comprising:
three cameras;
camera control electronics connected to said camera;
synchronization electronics in communication with said camera control electronics; and
one or more time code inserters in communication with said camera control electronics and said processor, said cameras capture said two or more images of said scene, said time code inserters insert time codes into said two or more images of said scene including said first image and said second image, said step of creating one or more video images by blending uses said time codes in said first image and said second image.

48. An apparatus according to claim 44, wherein said one or more processors assemble said new images of said scene into a movie that conveys the illusion of a camera moving around said scene as said scene appears frozen in time.

49. An apparatus according to claim 48, wherein said one or more processors edges in a first video image from a first camera, said two or more images of a scene include said first video image, find edges in a second video image from a second camera, said two or more images of a scene include said second video image, find edges in a third video image from a third camera, said two or more images of a scene include said third video image, create matches of at least portions edges in said first video image, said second video image and said third video image, create chains of said matches, discard bad chains, create morphs of at least a portion of said first video image and said second video image based on said chains, create a new set of video images, adding said morphs to said new set of video images, and assemble said new set of images into a video.

50. One or more processor readable storage devices having processor readable code embodied on said processor readable storage devices, said processor readable code for programming one or more processors to perform a method comprising the steps of:
   receiving a first image from a first camera;
   receiving a second image from said first camera;
   receiving a third image from said first camera;
   subtracting said second image from said first image to create a first difference
   subtracting said third image from said first image to create a second difference; and
   creating a union of said first difference and said second difference, said union identifies said foreground.

51. One or more processor readable storage devices according to claim 50, wherein said method further comprises the steps of:
   creating clusters of on pixels in said first difference;
   creating clusters of off pixels in said first difference;
   removing small clusters of on pixels in said first difference;
   filling in small clusters of off pixels in said first difference;
   creating clusters of on pixels in said second difference;
   creating clusters of off pixels in said second difference;
   removing small clusters of on pixels in said second difference; and
   filling in small clusters of off pixels in said second difference.

52. One or more processor readable storage devices according to claim 51, wherein said method further comprises the steps of:
   filtering said first difference;
   filtering said second difference; and
   filtering said union.

53. One or more processor readable storage devices according to claim 50, wherein said method further comprises the steps of:
   creating clusters of on pixels in said union;
   creating clusters of off pixels in said union;
   removing small clusters of on pixels in said union; and
   filling in small clusters of off pixels in said union.

54. An apparatus, comprising:
   a communication interface;
   one or more storage devices; and
   one or more processors in communication with said one or more storage devices and said communication interface, said one or more processors receive a first image from a first camera, receive a second image from said first camera, receive a third image from said first camera, subtract said second image from said first image to create a first difference, subtract said third image from said first image to create a second difference, and create a union of said first difference and said second difference, said union identifies said foreground.

55. An apparatus according to claim 54, wherein said one or more processors create clusters of on pixels in said first difference, create clusters of off pixels in said first difference, remove small clusters of on pixels in said first difference, fill in small clusters of off pixels in said first difference, create clusters of on pixels in said second difference, create clusters of off pixels in said second difference, remove small clusters of on pixels in said second difference, and fill in small clusters of off pixels in said second difference.

56. An apparatus according to claim 55, wherein said one or more processors filter said first difference, filter said second difference, and filter said union.

57. An apparatus according to claim 54, wherein said one or more processors create clusters of on pixels in said union, create clusters of off pixels in said union, remove small clusters of on pixels in said union, and fill in small clusters of off pixels in said union.

* * * * *